April 28, 1959 R. G. RUSSELL 2,883,798
APPARATUS FOR FEEDING MOLTEN GLASS
Filed March 8, 1954 4 Sheets-Sheet 1
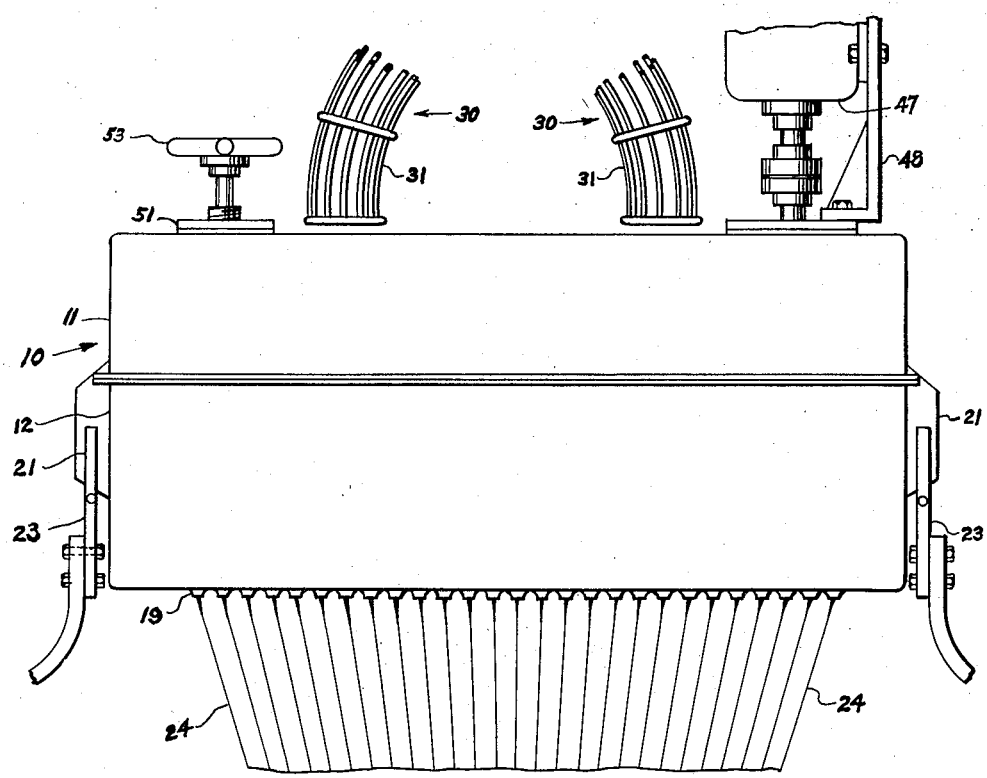
FIG.-1
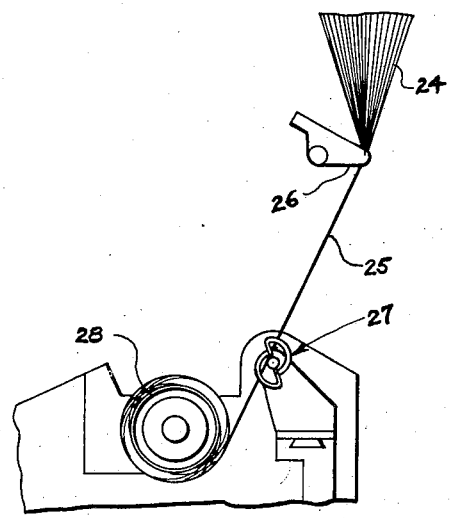
INVENTOR.
ROBERT G. RUSSELL.
BY
ATTORNEYS.

April 28, 1959  R. G. RUSSELL  2,883,798
APPARATUS FOR FEEDING MOLTEN GLASS
Filed March 8, 1954  4 Sheets-Sheet 2

*INVENTOR.*
ROBERT G. RUSSELL.
BY
ATTORNEYS.

INVENTOR.
ROBERT G. RUSSELL.
ATTORNEYS.

April 28, 1959 R. G. RUSSELL 2,883,798
APPARATUS FOR FEEDING MOLTEN GLASS
Filed March 8, 1954 4 Sheets-Sheet 4

INVENTOR.
ROBERT G. RUSSELL.
BY
ATTORNEYS.

United States Patent Office 2,883,798
Patented Apr. 28, 1959

2,883,798
APPARATUS FOR FEEDING MOLTEN GLASS

Robert G. Russell, Granville, Ohio, assignor to Owens-Corning Fiberglas Corporation, a corporation of Delaware Application March 8, 1954, Serial No. 414,543

13 Claims. (Cl. 49—53)

This invention relates to apparatus for feeding molten glass and this application is a continuation-in-part of my copending now abandoned application Serial No. 97,876 filed June 9, 1949 bearing the title Method and Apparatus for Feeding Molten Glass.

The invention particularly relates to apparatus for feeding molten glass in the form of minute streams which are attenuated to form continuous glass fibers. This type of glass feeder is referred to as a bushing in the industry and conventionally has been made in the form of a trough shaped receptacle in which is contained a body of molten glass. The bottom of the trough shaped receptacle is perforated to form a plurality of spaced orifices of the same diameter through which the individual streams flow. The bushing is usually electrically energized so that the material from which it is formed serves as a resistance heating element to melt the glass or keep it molten. The streams are usually attenuated into fibers by being mechanically grasped as, for example, on a rotary spool type package and pulled linearly at a speed of, say, 10,000 feet per minute. The constancy of the speed of attenuation and the fixed diameter of the orifices should, therefore, result in finished fibers of constant and uniform diameter.

Unfortunately, however, many other factors enter into the production of the finished glass fibers, some of which are extremely difficult to control. If the temperature throughout the body of molten glass varies its viscosity will also vary and the rate of attenuation of any of the streams into fibers will be affected. Impurities in the form of "seeds" (gas bubbles) "stones" or "cords" (areas of non-homogeneous glass) may enter and obstruct the minute fiber forming orifices or may be passed through the orifices and attenuated into fibers having improper constituents and thus non-uniform characteristics.

Not only is it difficult to maintain a uniform temperature in the bushing itself but it is even more difficult to reflect a uniform temperature from the bushing throughout the body of the glass contained in the bushing. This is particularly true where the bushing is relied upon to melt the glass as in the case of introduction of batch or collet directly into the bushing. In these cases the cold mass of material introduced into the bushing will, of course, not flow through the orifices or be attenuated to the same degree as will portions of glass which have been raised to a proper temperature. Attempts have been made to overcome this problem by establishing preheating chambers wherein the entire mass of glass is raised to a more or less uniform temperature and then flowed into the bushing. Even under these circumstances maintaining the glass at a uniform temperature is difficult.

The problem of feeding the material to the bushing, whether in premelted or cold form, becomes particularly difficult where the area over which the orifices extend is rather large as, for example, where 400 fibers are being pulled from a single bushing. Some attempt to simplify this melting has been made by the preforming of marbles of glass from a large glass melting tank where the ingredients can be rendered rather uniform. Use of marbles in a melting bushing reduces the variations in the raw material but heat absorption of the marbles is slow and, consequently, the capacity in the output of fibers from a bushing is relatively low.

It is the principal object of this invention to provide an apparatus for feeding molten glass in which a high order of homogeneity both as to temperature and constituents of the molten glass is maintained not only in any portion of the body of glass but throughout the entire body of the glass within the bushing so that the characteristics of fibers pulled are held to a minimum of variation.

Another object of the invention is to provide a fiber forming bushing wherein the capacity in output of fibers per unit of time can be varied and wherein the diameter of fibers being pulled from orifices of certain diameter can also be varied by varying the conditions within the bushing.

It is thus an object of this invention to provide an apparatus for feeding molten material in which the characteristics of the mass of material can be rendered highly uniform and the characteristics of the produced fibers varied at will.

Other and more specific objects and advantages of the instant invention will be better understood from the specification and from the drawings in which:

Fig. 1 is a fragmentary view in elevation of an apparatus for feeding molten glass embodying the invention and operable according to the method of the invention.

Figure 2:
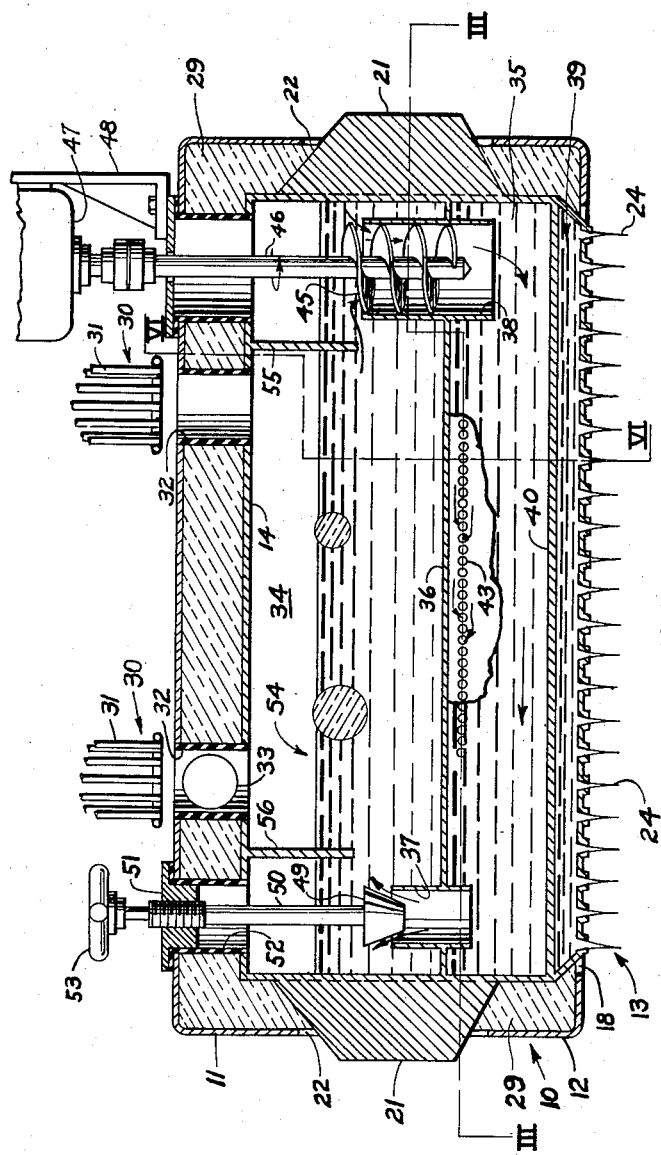
Fig. 2 is a vertical sectional view of the glass melting apparatus shown in Fig. 1.

The apparatus illustrated in Figs. 1, 2, 3 and 6 comprises among other parts an exterior casing 10 consisting of an upper shell 11 and a lower shell 12. The casing 10 surrounds a generally wedge shaped bushing generally indicated at 13 which has a top wall 14 and two downwardly extending vertical side walls 15 forming its upper section and two inclined side walls 16 which are joined at a tip section 17 forming the bottom of the bushing 13. The tip section 17 protrudes through a longitudinal slot 18 in the bottom of the shell 12 and has a plurality of individual tips 19 through each of which there is drilled a stream forming orifice 20.

At each end of the bushing 13 a protruding ear 21 extends outwardly of the casing 10 through a vertical slot 22 therein and the ears 21 are connected by connectors 23 (Fig. 1) to an electric circuit for supplying current which flows through the body of the bushing 13 energizing the metal walls of the bushing 13 as resistance heaters to melt and maintain in molten condition the mass of glass from which individual fibers 24 are pulled.

The plurality of individual fibers 24 (see Fig. 1) are gathered together to form a glass fiber strand 25 by a gathering eye 26 which may also supply a lubricant or coating material to the fibers 24. The strand 25 may be led directly across the spiral wires of a traverse 27 and into a rotary sleeve 28 for winding the strand 25 to form a cylindrical package, the traverse 27 acting to traverse the strand 25 back and forth across the spool 28 as it is wound up.

The space between the shells 11 and 12 and the walls of the bushing 13 usually is filled with ceramic material generally indicated in the drawings at 29 in order to prevent the escape of heat outwardly from the bushing 13.

In the embodiment of the invention shown in Figs. 1, 2, 3 and 6 a pair of marble feeding tubes generally indicated at 30 and formed from a plurality of spaced wires 31 terminate just above a pair of vertical bores 32 extending through the ceramic insulating material 29 and the top 14 of the bushing 13. The tubes 30 guide individual marbles, for example, the marble 33 shown in Fig. 2, into an interior melting chamber 34 in the upper part of the bushing 13.

The upper chamber 34 of the bushing 13 is separated from a lower recirculation chamber 35 by a horizontal plate 36 which extends entirely across the bushing 13 except for a pair of vertical tube-like passageways 37 and 38 leading from the upper chamber 34 to the recirculation chamber 35 and located one at each end of the bushing 13. A tip section chamber 39 which functions as a discharge channel leading to the tip section 17 (see particularly Figs. 2 and 6) is V-shaped in cross section flanking the recirculation chamber 35 along its sides and extending beneath the chamber 35 with a horizontal bottom plate 40 of the chamber 35 overlying and spaced above the tip section 17.

Side walls 41 (see Fig. 6) of the chamber 35 extend parallelly to the side walls 16 of the bushing 13 and then are directed upwardly forming parallel spaced vertical walls 42 which terminate against the undersurface of the horizontal plate 36 that forms the bottom of the chamber 34.

A series of apertures 43 is drilled through each of the vertical walls 42 at a level near the top of the chamber 35 to permit glass to flow from the chamber 35 into the upper lateral areas of the tip section chamber 39. A series of gas escape apertures 44 is drilled through the plate 36 (Fig. 6) connecting the upper chamber 34 directly to the tip chamber 39.

A screw 45 (Fig. 2) is mounted on the end of a vertical stem 46 that is dependingly supported and rotated by a motor 47 mounted on a bracket 48 on top of the casing 10. The screw 45 extends into the passageway 38 between the upper melting chamber 34 and the recirculation chamber 35. Rotation of the screw 45 in one direction produces flow of molten material from the upper melting chamber 34 into the recirculation chamber 35 whereas rotation of the screw 45 in the opposite direction would produce flow of molten material upwardly to the melting chamber 34. In Fig. 2 the arrows indicating the flow of material are drawn in the directions in which the material would move with the screw 45 being rotated in the direction of the arrow to feed molten material from the chamber 34 downwardly into the lower recirculation chamber 35.

The passageway 37 functions to allow the circulation of molten material from the recirculation chamber 35 upwardly into the end of the melting chamber 34 remote from the screw 45. The rate of flow of molten material from the chamber 35 may be controlled by varying the effective size of the passageway 37. This is accomplished by moving a cone valve 49 vertically. The valve 49 is secured on the lower end of a valve stem 50 the upper end of which is threaded into and extends through a threaded plug 51 in an opening 52 leading from the interior of the bushing 13 to the top of the casing 10. A hand wheel 53 is pinned or otherwise secured to the upper end of the stem 50 for rotating the stem 50 to produce vertical movement of the cone valve 49.

Figure 3:
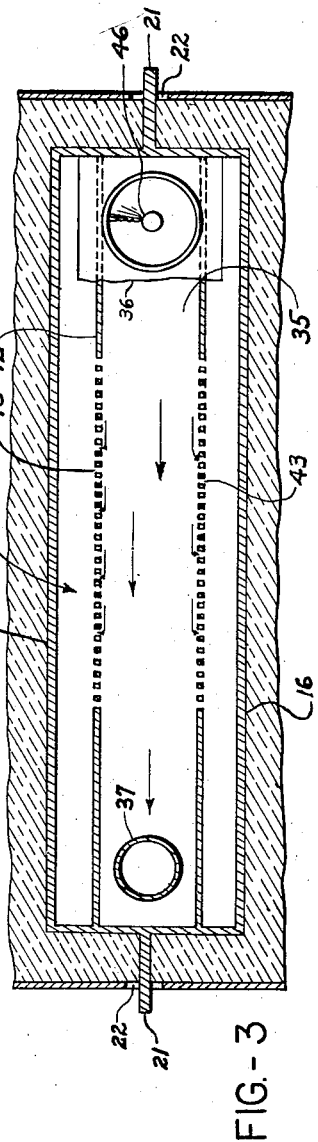
Fig. 3 is a horizontal sectional view of the apparatus of Fig. 2 taken substantially along the line III—III of Fig. 2.

In operating the unit as illustrated in Figs. 2 and 3 the left hand one of the marble tubes 30 is connected to a supply of marbles such as the marble 33. At timed intervals, depending upon the rate of flow of the fibers 24 from the bushing 13, additional marbles 33 are released through the tube 30 and dropped into the interior of the bushing 13. The marbles 30 fall into a pool of molten glass generally indicated at 54 which is maintained in the upper melting chamber 34. With the screw 45 operating in the direction indicated in Fig. 2 the flow of material proceeds from left to right in the melting chamber 34 and thus the cold marble 33 moves slowly across the pool of molten glass 54. Movement of the marble across the melting chamber 34 prevents the accumulation of a pile of unmelted marbles beneath the marble tube 30 and eliminates the difficulty of penetrating heat into the interior of such a pile of marbles 33. Movement of the marble causes the molten portion to be "wiped" away as it melts and the size of a marble gradually decreases as it moves across the chamber 34 toward the screw 45. A baffle 55, which may be perforated, depends from the top wall 14 of the bushing 13 downwardly beneath the level of the top of the pool of molten glass 54. The baffle 55 prevents an unmelted marble from flowing over to the upper end of the screw 45 where it might congeal on the screw 45 and thus interfere with the flow of molten material through the passageway 38.

Considering that no such interference is caused, since each of the marbles 33 is usually melted away by the time it reaches the baffle 55 or is held back by the baffle 55 until it is melted away, the molten glass is fed downwardly through the passageway 38 and into the recirculation chamber 35. The screw 45 not only produces the feeding action but it also violently agitates the glass within the tube forming the passageway 38 creating eddy currents and countercurrents therein which both homogenizes the glass in the passageway 38 with respect to its ingredients and tends to level out its temperature.

As the glass flows horizontally across the recirculation chamber 35 it is, of course, mixed in with other glass in the chamber 35 and is always subject to the heat being transmitted to the entire body of glass from the resistance heating walls of all of the chambers. The quantity of glass which is fed downwardly into the recirculation chamber 35 is in excess of the quantity of glass which normally can flow through the apertures 43 outwardly into the upper reaches of the tip chamber 39. Any glass in excess of the amount which will flow through the apertures 43 flows through the recirculation chamber and upwardly through the passageway 37 back into the melting chamber 34 at its left end. The glass flowing upwardly through the passageway 37 is hot so that the cold marbles 33 drop first into the hottest portion of the glass in the melting chamber 34. This, of course, increases the rate at which the marbles 33 are melted.

The quantity of glass which flows through the apertures 43 out of the recirculation chamber 35 depends not only upon the area of those apertures and upon the head produced by the level of glass in the melting chamber 34 but also upon the setting of the cone valve 49. If the valve 49 is down close to the upper end of the tubing forming the passageway 37 the annular orifice around the valve 49 is small. The action of the rotary pumping screw 45 creates pressure in the recirculation chamber 35 and, since a smaller escape passageway 37 is thus present, glass flows out the apertures 43 at a higher rate into the tip chamber 39. Conversely, if the valve 49 is raised to its upper position where it does not obstruct the passageway 37 less resistance to the flow from the recirculation chamber 35 back into the melting chamber 34 is presented and the pressure within the recirculation chamber 35 is lower so that a smaller quantity of glass flows through the apertures 43 at any given time.

The glass which flows through the apertures 43 fills the tip chamber 39 and, under the pressure of the heated pool of glass 54 and such pressure within the recirculation chamber 35 as may be produced by the setting of the valve 49, is extruded or allowed to flow out of the tips 19. If the pressure within the tip section chamber 39 is high, i.e., by closing the valve 49, a greater quantity of glass flows through the tips 19 during any given period of time and, considering the attenuation rate of the fibers 24 to remain constant, fibers of thicker diameter are formed. Conversely, if the pressure within the tip section chamber 39 is low, for example, by opening the valve 49, less glass flows out of the tips 19 and fibers 24 of lesser diameter are attenuated at the same speed.

In addition to providing for the effective melting of the marbles by recirculation of the mass of molten glass within the melting chamber 34 and recirculation chamber 35, recirculation of the glass insures that only a small part of any separate mass of glass which may have been introduced into the melting chamber 34 as a single marble will flow out any of the particular orifices 43 or any one of the tips 19. Only a small percentage of any particular portion of glass which enters the recirculation chamber 35 at any given time will flow out of the apertures 43, the remainder of the glass in that portion being recirculated back into the melting chamber 34. Thus recirculation produces both temperature and constituent uniformity and homogeneity.

As was earlier mentioned, impurities in the forms of "seeds," "gas bubbles," "stones" and "cords" may be present in the melting chamber 34 and even in the recirculation chamber 35 in spite of the best efforts to make the marbles or other supply uniform and to maintain uniform temperature conditions. If gas bubbles are carried into the melting chamber 34 either in the marbles 33 or with the marbles 33, they may either be driven out of the glass by its recirculation or, if they should pass through the apertures 43, they enter the upper reaches of the tip chamber 39 where the section of glass is quite thin. Both sides of this thin section of glass are subject to heat from the outer walls 16 of the bushing and the walls 41—42 of the recirculation chamber. The application of heat from both sides to this thin section of glass tends to force the gas out of the walls so that it can pass upwardly through the gas escape apertures 44 into the upper heating chamber 34.

The apertures 43 also act as a screen to prevent "stones" from passing into the tip chamber 39 where they might block one or more of the tips 19 interrupting the flow of glass.

If any cords are present in the melting chamber 34 the chance of them passing through the tip section 19 is very slim. Cords, consisting as they do of stringy or wormy masses of unhomogeneous glass, have structural integrity in the same sense that a glob of grease floating in water would have. As these cords pass through the pumping screw 45 its action tends to sever them into smaller parts and to homogenize them with the glass in which they are located. If the cords pass either solid or in smaller pieces into the recirculation chamber 35 they flow at right angles to the apertures 43. Since they flow past the apertures 43 at right angles thereto the flow of glass past the apertures does not allow the cord to pass through any one of the apertures 43 as a unit and even if a small piece of a cord enters one of the apertures 43 the remaining portion of cord is moved beyond the apertures before it can flow therethrough. Thus the apertures 43 not only screen out solid impurities such as stones but they function to break up cords which might otherwise flow in one piece to the tip section 17.

Even if any small cords do pass as integral bodies to the tip section 17, there again the direction of flow is such that they pass over one or more of the tip orifices 20 moving in a horizontal direction, i.e., perpendicular to the orifice 20. It has been found that this movement of glass past the orifices induced by the recirculation, particularly within the chamber 35, effectively breaks up cords to such an extent that fiber interruption due to the passage of a cord through one of the tips 19 is practically eliminated.

Figure 6:
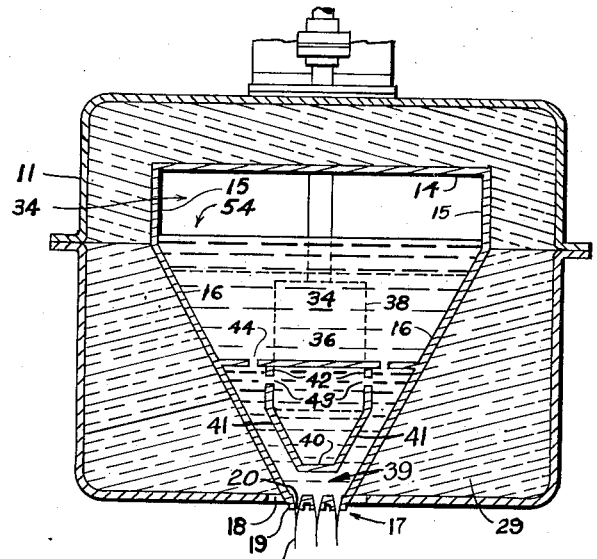
Fig. 6 is a vertical sectional view taken along the line VI—VI of Fig. 2.

The melter unit illustrated in Figs. 2, 3 and 6 is shown being operated to produce clockwise circulation of the glass. Under some conditions it may be desirable to operate the unit to produce counterclockwise flow of glass. To achieve counterclockwise flow the screw 45 is reversed so that it produces upward movement of the glass through the passageway 38. In this case marbles are introduced into the unit through the right hand marble tube 31 rather than the left hand marble tube 31. The cold marbles thus flow from right to left in the chamber 34 and their passage downwardly through the passageway 37 is prevented by a second baffle 56 similar or identical to the baffle 55. In this case glass flows downwardly through the passageway 37 around the valve 49.

A still greater degree of control over the pressure on the glass in the recirculation chamber 35 and thus on the glass in the tip section chamber 39 is thus made possible by adjustment of the valve 49. With glass circulating in the counterclockwise direction if the passageway 37 were open the pressure in the recirculation chamber 35 would be the sum of the pressure of the head of glass in the melting chamber 34 minus the negative pressure in the chamber 35 created by upward movement of the glass through the passageway 38. If the valve 49 is substantially closed the effect of the pressure of the head of the glass in the chamber 34 is lessened and thus the level of glass in the chamber 34 may rise and the quantity of glass flowing outwardly through the apertures 43 into the tip chamber 39 may be substantially reduced.

The apparatus of the invention involves the concepts of homogenizing a mass of glass both as to temperature and constituents by recirculation, the introduction of new raw material into the system, preferably at a point in the recirculation where the mass being recirculated is hottest and the divergence of a portion of the glass being recirculated from the recirculation path to a path leading to the fiber forming tip section. Positive acting means are present at several points throughout the recirculation and diversion system to provide a long tortuous path for the glass and thus to expose it to a large heating area for making the temperature uniform and for preventing impurities from passing through to the fiber forming portions of the device.

Figure 4:
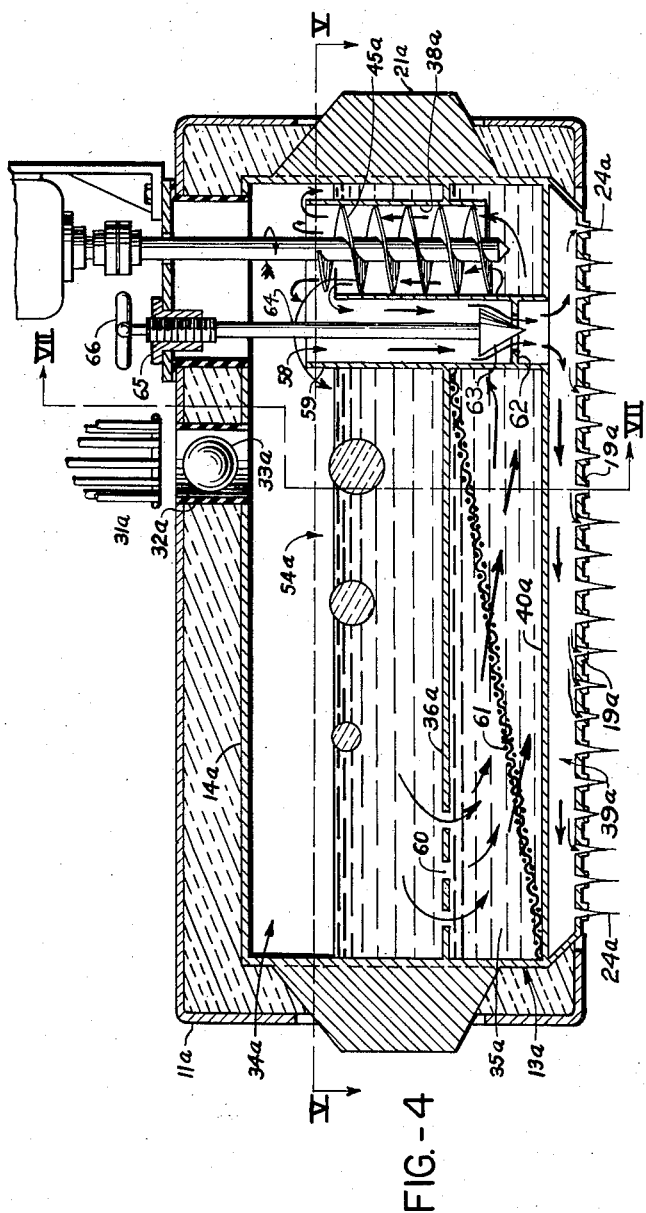
Fig. 4 is a vertical sectional view of apparatus constituting another embodiment of the invention and upon which the method of the invention can be performed.
Figure 5:
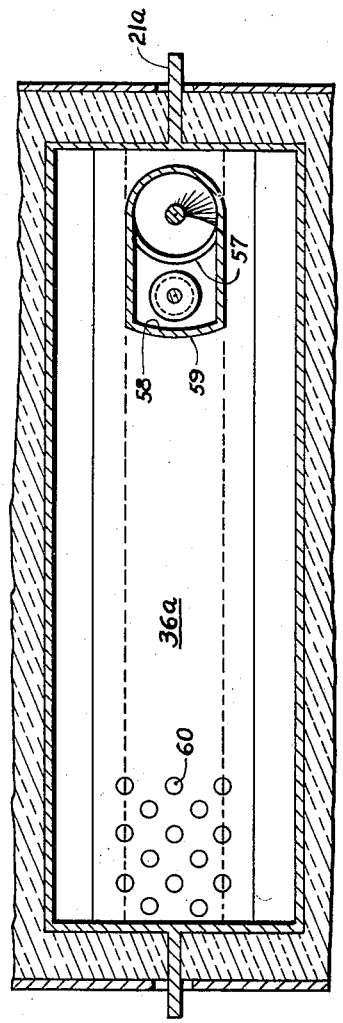
Fig. 5 is a horizontal sectional view taken substantially on the line V—V of Fig. 4.
Figure 7:
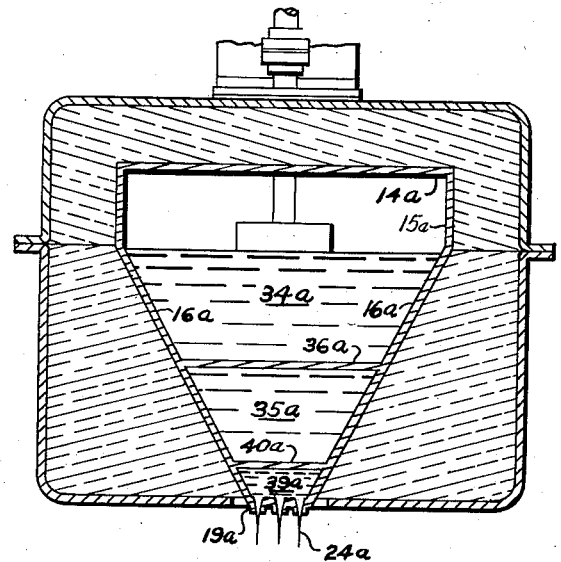
Fig. 7 is a view similar to Fig. 6 but taken along the line VII—VII of Fig. 4.

The modification of apparatus embodying the invention which is shown in Figs. 4, 5 and 7 is similar to that of the other figures but comprises several changes. In this form of apparatus a bushing generally indicated at 13a has an exterior shell 11a, a top wall 14a, upper side walls 15a, inclined side walls 16a and a horizontally extending bottom plate 36a and the bushing 13a is electrically energized by connections (not shown) made to ears 21a. Many other parts of the bushing 13a are similar in design and function to similar parts of the bushing 13 of Figs. 1, 2, 3 and 6 and, therefore, are not described with respect to the bushing 13a. An upper melting chamber 34a is separated by the plate 36a from a lower generally rectangular recirculation chamber 35a having a bottom 40a which also defines the top of a generally rectangular tip section chamber 39a which serves as a glass discharge channel leading to bushing tips 19a. In this modification of the invention the right end of the recirculation chamber 35a is connected to the melting chamber 34a by a passageway 38a in which there is located a screw pump 45a. At the upper end of the passageway 38a a wall 57 thereof is common to a downwardly extending passageway 58 leading from the melting chamber 34a directly to the tip chamber 39a. The wall 57 is cut down between the passageways 38a and 58 and a far wall 59 of the passageway 58 is higher than the wall 57 thereof.

At the other end of the melter 13a the melting chamber 34a is connected to the recirculation chamber 35a by a plurality of apertures 60 cut through the plate 36a. A screen 61 of, say, 45 mesh approximately, extends diagonally across the recirculation chamber 35a in the embodiment of Figs. 4, 5 and 7 serving to screen out stones and to help break up cords before they reach the passageway 38a and are fed upwardly back into the chamber 34a. The small openings or apertures 43 of the modification of the invention illustrated in Figs. 2, 3 and 6 serve a similar function. In the embodiment of Figs. 4, 5 and 7 a single marble tube 31a is aligned to admit marbles through an opening 32a in the shell 11a and upper wall 14a of the bushing 13a.

Marbles 33a dropped into the melting chamber 34a are moved in a counterclockwise direction (to the left) and molten glass flows downwardly through the apertures 60 into the left end of the recirculation chamber 35a. The screen 61 screens out large sized impurities and breaks up cords and the molten glass flows horizontally across the chamber 35a to its far right end, passing around the walls 57 and 59 forming the passageway 58 and reaching the far end of the chamber 35a beneath the screw 45a. Rotation of the pumping screw 45a feeds the glass upwardly through the passageway 38a and spills at least some of it over the upper edge of the wall 57 and down into the passage 58. The remainder of the glass fed upwardly by the screw 45a flows over the wall 59 and back into the pool of glass generally indicated at 54a in the melting chamber 34a.

The glass which flows downwardly through the passageway 58 enters the tip chamber 39a and flows horizontally out across the tip chamber 39a to the tips 19a whence it issues as streams to be attenuated into individual fibers 24a.

In order to provide for control of pressure within the tip chamber 39a the passageway 58 is provided with a valve comprising a concentric seat 62 near the bottom of the passageway 58 and a cone pointed valve 63 mounted on the lower end of a stem 64 which extends upwardly and is threaded into a plug 65 at the top of the shell 11a and has a hand wheel 66 on its upper end. By varying the annular orifice formed by the valve 63 and seat 62 the effect of the constant head of pressure maintained in the vertical passageway 58 upon the glass in the tip chamber 39a may be varied to produce changes in the rate of flow of glass through the tips 19a.

Operation of the apparatus of Figs. 4, 5 and 7 according to the concept of invention has the same result in producing uniformity of temperature, homogeneity of constituents and control over production as is possible with the apparatus illustrated in Figs. 1, 2, 3 and 6 although, because of the relationship of the valve to the screw in the two different embodiments, the degree of control over the pressure present in the tip section chambers 39 and 39a may be substantially different.

I claim:

1. A glass melting and feeding bushing for providing a plurality of fine streams of molten glass, said bushing comprising imperforate side walls and a common wall dividing said bushing to form at least a melting chamber and a recirculation chamber; means for energizing all of said walls for heating glass in said bushing; a pair of spaced passageways extending between said chambers through said common wall; rotary pump means operable in one of said passageways for pumping molten glass from one of said chambers into the other of said chambers, said melting chamber only having a cold material introducing opening positioned at a point in the pathway between said passageways adjacent that one of said passageways through which molten glass is returned from said recirculation chamber into said melting chamber; a molten glass discharge channel communicating with the recirculation pathway comprising said melting chamber, said recirculation chamber and said passageways and means for rotating said pumping means to produce circulation in said pathway.

2. Apparatus according to claim 1 in which the molten glass discharge channel consists of a third chamber, said third chamber being defined by at least one of the walls of said recirculation chamber and the side walls of said bushing, and having a plurality of stream forming orifices in its bottom wall.

3. Apparatus according to claim 1 in which said common wall extends horizontally across said bushing dividing said bushing into an upper melting chamber and a lower recirculation chamber and the passageways therebetween extending vertically.

4. Apparatus according to claim 3 in which variable valve means are located in the path of flow of molten glass for controlling the flow of glass between said recirculation chamber and said discharge channel.

5. Apparatus according to claim 3 in which variable valve means are located in that one of the passageways other than that in which said pump is located.

6. Apparatus according to claim 3 in which the molten glass discharge channel consists of a third chamber located beneath said recirculation chamber and said third chamber only has a plurality of stream forming orifices in its bottom wall.

7. Apparatus according to claim 6 in which part of the path of molten glass through the bushing between the melting chamber and the third chamber is defined by a plurality of small openings.

8. Apparatus according to claim 6 in which the third chamber extends beneath and on both sides of the recirculation chamber and the escape channel consists of said third chamber and a plurality of small openings through the walls of the recirculation chamber into said third chamber at a level near the top of the recirculation chamber, such openings extending transversely out of said recirculation chamber so that glass being recirculated moves across such openings.

9. A bushing or furnace for issuing a plurality of molten glass streams to be attenuated comprising a receptacle, a separating wall dividing the receptacle into upper and lower compartments communicating through an inlet through the wall and a return outlet through a spaced portion of the separating wall, said lower compartment having a glass escape channel, a feed screw cooperating with a cylindrical housing to force melt from the upper compartment into the lower compartment at a rate corresponding to the speed of the feed screw, said return outlet having a total area less than sufficient to allow passage therethrough of melt fed by said screw into said lower compartment, whereby pressure is built up in the lower compartment and melt is recirculated from the upper compartment, past the escape channel in the lower compartment through which some of the melt issues, and back through the outlet in the separating wall into the upper compartment.

10. A bushing or furnace as claimed in claim 9 in which baffles are provided in the upper compartment to increase turbulence and insure that the materials travel through a tortuous path on their way to the feed screw.

11. Apparatus for providing a plurality of fine streams of molten glass, said apparatus comprising a bushing consisting of a top, imperforate side and end walls, a bottom having a plurality of spaced stream forming orifices, a plurality of spaced partition walls extending across said bushing and dividing said bushing into an upper melting chamber, a central recirculation chamber and a lower discharge chamber immediately above said stream forming orifices, a pair of spaced molten glass passageways extending vertically between said melting and said recirculation chambers, a pump in one of said passageways, said melting chamber, recirculation chamber and passageways forming a recirculation pathway for molten glass, a molten glass diverting passageway leading from said recirculation pathway to said discharge chamber, a variable valve in one of said passageways other than that in which said pump is located and means for actuating said pump for causing circulation of glass through said recirculation pathway and into said diverting passageway in quantity determined by the pressure relationship between the glass in said discharge chamber and the glass in said melting chamber.

12. Apparatus according to claim 11 in which the valve is in one of said passageways between said recirculation chamber and said melting chamber and the pump is actuated to pump glass from said melting chamber into said recirculation chamber in quantity in excess of that which will normally flow through said valve and out of said diverting passageway.

13. Apparatus according to claim 12 in which said diverting passageway is formed by a plurality of small openings from said recirculation chamber to said discharge chamber extending through the walls of said recirculation chamber at a level well above the bottom thereof.

References Cited in the file of this patent

UNITED STATES PATENTS

| | | |
|---|---|---|
| 1,710,789 | Soubier | Apr. 30, 1929 |
| 1,959,417 | Flexon | May 22, 1934 |
| 2,331,946 | Pazsiczky et al. | Oct. 19, 1943 |
| 2,407,295 | Simison et al. | Sept. 10, 1946 |
| 2,411,031 | Dayrup | Nov. 12, 1946 |
| 2,515,478 | Tooley et al. | July 18, 1950 |
| 2,716,023 | Cleveland | Aug. 23, 1955 |

FOREIGN PATENTS

| | | |
|---|---|---|
| 711,976 | France | Sept. 22, 1931 |
| 725,225 | Great Britain | Mar. 2, 1955 |